June 14, 1932.  G. T. SOUTHGATE  1,863,507
PROCESS OF AGGLOMERATING AND REDUCING ORES
Filed Aug. 26, 1930
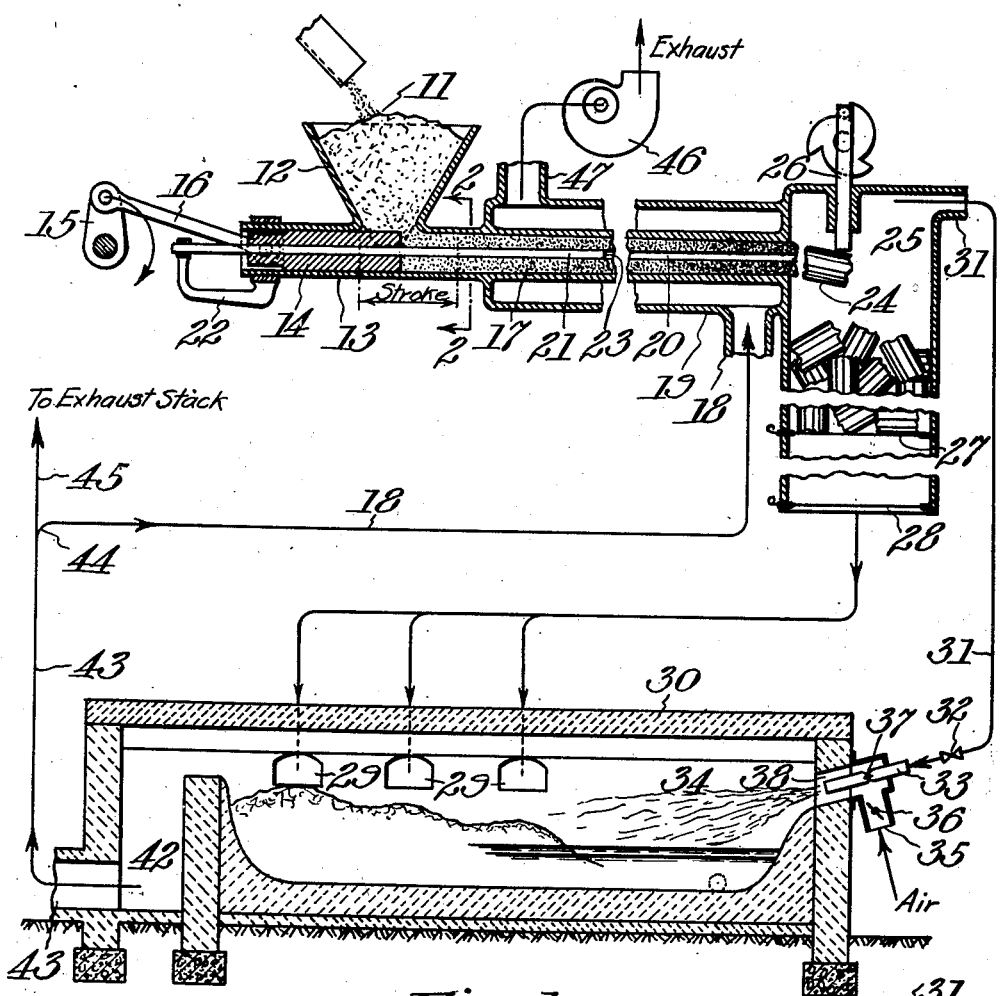
Fig.1.
Fig.2.
Fig.3.
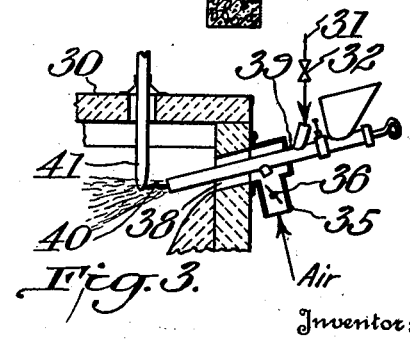

Patented June 14, 1932

1,863,507

UNITED STATES PATENT OFFICE

GEORGE T. SOUTHGATE, OF FOREST HILLS, NEW YORK

PROCESS OF AGGLOMERATING AND REDUCING ORES

Application filed August 26, 1930. Serial No. 477,939.

My invention relates to processes in which ores are agglomerated into mechanically impacted combination with the reducing carbon required in their subsequent smelting, and in which simultaneously there is produced in the working of said agglomeration a hydrocarbon gas capable of furnishing by combustion a part or all of the heating required in said smelting. In agglomerating the ores I utilize as a binding material a substance which, when heated, will leave within the agglomerate the required reducing carbon and will simultaneously give off, by distillation, hydrocarbon gases which may be used as and for the function of the combustible gas aforementioned. Such materials capable of the thermal deposition of carbon or coke and the simultaneous production of fuel gases are bituminous coals, bituminous or asphaltic pitch, mineral or vegetable tars, "sulphite" pitch obtained as a by-product of the manufacture of paper, and various hydrocarbon wastes of manufacturing processes.

This application is a continuation-in-part of my prior application Serial No. 642,106, filed May 28th, 1923.

One of the objects of my invention is to cheapen the agglomeration of ores in combination with their reducing carbon by simultaneously producing as a credit to the cost thereof, the aforementioned gas, derived from the carbonaceous material which serves to bind the agglomerate and to furnish the reducing carbon.

Another object of my invention is to produce agglomerates in which the carbon required for chemical reduction in smelting is impacted in intimate admixture with the ores to be reduced; so that smelting may proceed with the utmost rapidity, efficiency and thoroughness.

Another object of my invention is to produce agglomerates in which the aforementioned contained carbon is protected, within the bodies of the agglomerates, from oxidation by the gases surrounding the agglomerates within a smelting furnace.

Another object of my invention is, by the use in smelting of agglomerates wherewithin the reducing carbon is protected from external gases to facilitate the oxidation of said gases to the degree of obtaining mainly the dioxide instead of the monoxide of carbon.

Another object of my invention is to produce agglomerates which are strong in resistance to compression, abrasion, gaseous erosion and other disintegrating mechanical forces.

Another object of my invention is to produce agglomerates within which endothermic reactions can occur by reductive chemical action when smelted, and externally thereto exothermic reactions upon the adjacent burning of the gases resulting from said chemical reduction; with consequent efficient and economical transfer of the heat of said exothermic reaction into the agglomerate wherewithin there is a demand for heat due to said endothermic reactions.

With these objects, and particularly with their full combination in view, my invention consists of the novel combination of steps constituting the process; all as will be hereinafter more fully disclosed and described, and particularly pointed out in the claims.

My present invention may be used with benefits mutual to the working of each, in combination with my prior invention disclosed in United States Letters Patent Reissue No. 16,149 of August 25th, 1925, entitled "Process and apparatus for introducing electric energy into a space of action". That is to say: one of the principal practical applications of the prior invention is the joint use of fuel and electricity in heating operations, especially those of smelting, with such proportions of these two energies that the fuel supplies the bulk of the heat while the intensely hot arc from but a relatively moderate or small flow of electric energy provides such superheating as may be desired. There being, through this superheating of fuel combustion with a moderate amount of electricity an improvement in thermo-chemical efficiency and a resultant saving in the total energy consumption of smelting processes, such saving may be further improved by using for smelting fuel, gases that are by-products of the hereindisclosed economical method of ore agglomeration; said fuel gases being introduced into smelting furnaces via the nozzle-electrodes of the said prior invention.

The novel features of my invention relate to processes in which thorough mixtures of comminuted ores and carbonaceous binders (together with suitable fluxes if desired) are passed slowly through suitable zones while being simultaneously impacted and heated. Such treatment may be effected by various means. For example, the matter may be pushed into one end of an externally heated stationary tube and correspondingly ejected from the other end. Or it may be fed into the end of a heated rotary kiln in which the agglomerative material will roll into nodules and become hardened. Any suitable apparatus may be employed for the purposes hereof provided the apparatus be sufficiently gas-tight, that it have proper arrangements for removal of the gases liberated by the heating of the material so that these gases may be conserved and used as smelting fuel, and that it be capable of impacting the mixed materials while simultaneously heating them sufficiently to coke the hydrocarbon binding content and thus drive off the said gases.

A performance of the process according to these requirements is illustrated by the following, reference being made to the accompanying drawing in which:

Fig. 1 is a sectional elevation of one form of suitable agglomerating and gas-generating apparatus, with diagrammatic connections to its furnace served;

Fig. 2 is an enlarged cross-section, in plane 2—2, of the impaction-tube and core-tube thereof;

Fig. 3 is a detail of a combined gas burner and arc electrode which may be employed to give electric superheating in a furnace operated by the process of the present invention.

As a case of smelting in which joint agglomeration and fuel-gas utilization may be advantageously applied, I will choose the production of phosphoric acid from tricalcium phosphate. Mineral phosphate and its usual flux silica, both in comminuted condition, are mingled in proper ratios with a material capable of yielding the desired fuel gas and leaving the required solid carbon in the agglomerate, such as powdered coking coal. This mixture 11 is continuously fed into hopper 12 and thus down into the cylinder 13, which is open in its upper rear portion for communication with the hopper. Within the cylinder is a plunger 14, which is continuously reciprocated as by the crank 15 and connecting rod 16. With each rearward motion of the plunger a charge of the mixture is received, and with each advancement of the plunger this charge is compressed against the previously driven charge which, in turn, is driven forward by the successive new charges, into and along the impaction tube 17. The bore of this tube is preferably tapered slightly smaller in the direction of travel of the charge, in order to give a high resistance to the motion thereof and to compensate for the shrinkage of the mixture from compression and degasification.

Tube 17 is externally heated as by the hot gases from the flue 18 passing through the jacket 19, derived for example by burning fuel or by passing through the jacket some or all of the hot effluvient from the smelting furnace. This heating should preferably increase in intensity from the ore-receiving to the agglomerate-discharge end of the impaction tube, and should raise the mixture to a final temperature sufficient to drive out practically all of the volatile matter in the coal and thus to convert it into a strong coke.

The gases driven from the mixture by the heat, including the hydrocarbons in the coal and any moisture or other volatiles present in the ingredients, are educted from the agglomerate-discharge end of the impaction tube 17 via the hole 20 formed in the body of the agglomerate by the core 21. This core is an externally smooth, stationary tube passing snugly through the plunger, closed at its rear end and fastened by the bracket 22, and extending along the axis of the impaction tube to an end 23 within the portion of the ore-mixture that is sufficiently hardened not to collapse into the core hole therebeyond. For some distance back of end 23 it is laterally perforated, for reception of the gases driven from the mixture in order that they may be educted through tube-end 23 and agglomerate-hole 20. Due to the loss of the gases from the mixture and to the simultaneous application of the impacting pressure along the tapering bore, the agglomerates 24 become very dense, strong and impervious to oxidizing gases to which they are subsequently exposed in the smelting furnace.

Both the gas and the agglomerates are collected in the discharge chamber 25. The agglomerates are broken into short pieces as they emerge from the impaction tube, as by a trip hammer 26, and may be removed from the chamber through the valves 27 and 28 forming an air lock and delivered to the charging doors 29 of the smelting furnace 30.

The fuel gas received in chamber 25 is conducted therefrom through flue 31 and valve 32 into one or more burners 33 discharging into the hearth 34 of the smelting furnace 30, along with air for the combustion thereof drawn from the atmosphere through flue 35 and valve 36. Some of this air may pass into the gas burner through suitable holes 37 as in a Bunsen burner, serving thus as primary air; and the balance is led into the furnace as secondary air at port 38.

When it is desired to superheat electrically the combustion within the furnace, burner 33 is replaced by a nozzle-electrode 39 as in Fig. 3. The other terminal of the arc 40 may be upon the electrode 41, passing through the roof of the hearth. Nozzle-electrode 39 and return electrode 41 are included in a suitable power supplying and regulating circuit; and either 39 or 41 must be electrically insulated, but the other may be grounded.

The usual gasworks auxiliaries, such as holders and regulators may be suitably included in the gas system, and need not be illustrated in the drawing.

The exhaust from the furnace passes through port 42 via the flue 43 which divides at the branch 44 into a main flue 45 and the aforementioned flue 18 supplying the heating jacket 19 of the impaction-tube 17. Suction, or draft, is imparted to the main exhaust flue 45 by the usual chimney or stack (not shown) and to heating jacket 19 by the exhaust fan 46 drawing on flue 47.

The phosphate-silica-carbon agglomerates of this example are subjected to heating under oxidizing conditions, if the furnace be operated with sufficient air to burn to the dioxid the carbon monoxid coming from the reaction

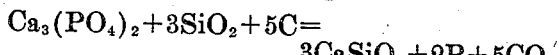

$$Ca_3(PO_4)_2 + 3SiO_2 + 5C = 3CaSiO_3 + 2P + 5CO,$$

for the economical purpose of utilizing the large heat of oxidation of the monoxid in the furnace. One of the novel and advantageous features of the present invention lies in the high oxidation resistance imparted to the carbon by the compact burying thereof within the agglomerate, whose ratio of surface to mass can be made small by agglomerating in rather large sizes, say six inches diameter by six or more inches in length. In this case, viz. phosphate smelting, the amount of bituminous coal required to give adequate reducing carbon in the agglomerate will furnish a sufficient flow of fuel gas for the necessary rate of heating, if the furnace and its operation be efficient.

Similarly, my improved process and apparatus may be applied in the smelting of iron from one of its ores, or ferro-alloys from their usual ores, by commingling therewith bituminous coal or other suitable carbonaceous matter, together with suitable flux, agglomerating as herein set forth, recovering the by-product gas, and heating the agglomerates in a smelting furnace, with this gas for fuel. As in the first example, the smelting may be operated under strongly oxidizing combustion, with or without electric super-heating according to the refractoriness of the ore and the desired speed of operation. As the reduction of these ores by carbon evolves carbon monoxid, and as the agglomerates can bear strongly oxidizing combustion without considerable loss of their contained reducing carbon, the high fuel value of the CO may be exploited directly in the furnace.

I am aware that certain processes have been disclosed, in which coal slack or fines are agglomerated by means of their own content of, or added, bituminous plastics heated to partial or complete coking; and I have noted that it has been suggested in such fuel briquetting processes that the evolved hydrocarbon gases be recovered for use as fuel. However, there has never heretofore been disclosed, to my knowledge, a process in which is effected the extremely advantageous combination of the following five-fold functions of the agglomerate: (1) binder of loose or comminuted ore; (2) furnisher of reducing carbon by its own coking; (3) protector of said carbon from oxidation by the gases in smelting furnaces; so that said carbon may act purely as a reducer and not as a fuel, and further may permit full combustion of all carbonaceous gases in said furnaces to the dioxid instead of the monoxid; (4) holder of extreme intimacy between the ore and its reducing agent; and (5) promoter of the abovementioned vicinal, and efficient, transfer of heat from exothermically to endothermically reacting zones.

Where oxidation of hydrocarbon gases can be carried as far as the dioxid of the carbon content, rather than to the monoxid, much more combustion heat is liberated and greater overall thermal efficiency attained. In smelting furnaces this can be done only where the reducing carbon is protected from the oxidizing furnace atmosphere by some means, as in my invention, by the burying of the coke in the ore agglomerates.

It will be understood as of the essence of my invention, that simultaneously with the impacting of the mingled ore and carbonaceous matter, the latter is thermally coked, and it thus interlocks with and binds the ore while yielding fuel gas for heating the agglomerates separately in a smelting furnace.

I claim:

1. The process of agglomerating and reducing ores which comprises commingling comminuted ore and hydrocarbons, subjecting said mixture simultaneously to heat and to pressure to drive off hydrocarbon gases and to produce a dense non-porous agglomerate of interlocked fixed carbon and ore, transferring said agglomerate to a furnace, and burning said evolved hydrocarbon gases in the furnace in admixture with an oxidizing gas in such proportions that carbon monoxide formed within the furnace will be oxidized to carbon dioxide.

2. In smelting a briquetted mixture of ore and reducing carbon by oxidizing combustion flames, the method of diminishing the oxidizing action of the combustion flames upon the reducing carbon content of the briquettes while gases evolved from the briquettes are being exothermically oxidized immedately adjacent to and in heat-transferring relation to said endothermically reacting briquetted masses, which comprises forming said masses as agglomerates of comminuted ore interlocked with fixed carbon, by impacting and simultaneously heating a mixture of ore and cokable carbonaceous matter.

In testimony whereof, I affix my signature.

GEORGE T. SOUTHGATE.